US012778074B1

(12) United States Patent
Ugalde et al.

(10) Patent No.: US 12,778,074 B1
(45) Date of Patent: Nov. 3, 2026

(54) ROTARY PARLOR ANIMAL ENTRY AND EXIT SYSTEMS

(71) Applicant: MADERO EQUIPOS DE ORDEÑO, S.A. DE C.V., Torreón Coahuila (MX)

(72) Inventors: Jose Antonio Ugalde, Torreón Coahuila (MX); Pedro Patricio Madero, Torreón Coahuila (MX); Marco Rodriguez Royal, Torreón Coahuila (MX); Pedro Gerardo Madero, Torreón Coahuila (MX)

(73) Assignee: MADERO EQUIPOS DE ORDEÑO, S.A. DE C.V., Torreón (MX)

( * ) Notice: Subject to any disclaimer, the term of this patent is extended or adjusted under 35 U.S.C. 154(b) by 36 days.

(21) Appl. No.: 19/428,207

(22) Filed: Dec. 21, 2025

(51) Int. Cl.
*A01K 1/12* (2006.01)
*A01K 1/00* (2006.01)
*A01K 1/06* (2006.01)

(52) U.S. Cl.
CPC ............ *A01K 1/126* (2013.01); *A01K 1/0023* (2013.01); *A01K 1/0029* (2013.01); *A01K 1/0613* (2013.01)

(58) Field of Classification Search
CPC .... A01K 1/126; A01K 1/0023; A01K 1/0029; A01K 1/0613; A01K 1/12; A01K 1/0041
See application file for complete search history.

(56) References Cited

U.S. PATENT DOCUMENTS 3,783,830 A * 1/1974 Holm ...................... A01K 1/12 119/524
7,296,536 B2 11/2007 Umegard
7,874,263 B2 1/2011 Schulte
8,079,325 B2 12/2011 Van Hoven
8,087,382 B2 1/2012 Sundborger
8,171,882 B2 5/2012 Van Hoven
8,286,584 B2 10/2012 Lindstrom
8,624,744 B2 1/2014 Holmgren et al.
8,991,334 B2 3/2015 Nilsson
9,510,553 B2 12/2016 Anglart et al.
2005/0223997 A1 10/2005 Umegard
2008/0127896 A1 6/2008 Petterson et al.
2008/0282985 A1 11/2008 Schulte
2009/0320758 A1 * 12/2009 Barba .................. A01K 1/126 119/14.02
2010/0116211 A1 5/2010 Sundborger
2010/0192861 A1 8/2010 Van Hoven
(Continued)

OTHER PUBLICATIONS

Madero Dairy Systems, Inc., "Premium Rotary System" brochure, pp. 1-6, published by Madero Dairy Systems, at least as early as Mar. 11, 2020, Houston, Texas (USA).

*Primary Examiner* — Trinh T Nguyen
(74) *Attorney, Agent, or Firm* — Jeffrey L. Wendt; The Wendt Firm, P.C.

(57) ABSTRACT

Animal milking, treatment and inspection systems and methods of using same. Systems include a rotary milking platform having entry and exit platforms, and one or more interior chutes downstream of the exit platform defined by fencing to direct animal flow to one or more treatment pens or to the main exit hall after traversing the rotary milking platform and being milked. One or more position-adjustable gates are provided on the entrance and exit of each chute, that may be manually or automatically controlled to control the flow of animals through the various chutes and gates to treatment and/or palpation pens, or other treatment pens such as a hoof trimming pen. Opening and closing of the entry and exit gates may be synchronized with rotation of the rotary milking platform.

9 Claims, 16 Drawing Sheets

(56) References Cited

U.S. PATENT DOCUMENTS

| | | | |
|---|---|---|---|
| 2010/0282171 A1 | 11/2010 | Lindstrom | |
| 2010/0289649 A1 | 11/2010 | Holmgren et al. | |
| 2012/0085287 A1 | 4/2012 | Van Hoven | |
| 2012/0103266 A1 | 5/2012 | Nilsson | |
| 2013/0087100 A1 | 4/2013 | Nilsson | |
| 2015/0107518 A1 | 4/2015 | Anglart et al. | |
| 2017/0265449 A1 | 9/2017 | Sandgren | |
| 2021/0037780 A1* | 2/2021 | Krone | A01J 7/025 |
| 2021/0169039 A1* | 6/2021 | Stuessel | A01K 1/126 |

* cited by examiner

A

162 e) Routing the one or more animals onto an exit platform having a diverging fencing section, the diverging fencing section directing animals to move from the stalls of the rotary platform onto the exit platform, the exit platform having a proximal edge adjacent the first periphery of the annular rotary platform, and exterior exit fencing and interior exit fencing, the exit platform having first and second exit platform sections, the interior exit fencing having a V-section dividing the rotary parlor exit platform into first and second exit platform sections, the first exit platform section further divided into a first main animal exit hall and a first interior chute, the second exit platform section further divided into a second main animal exit hall and a second interior chute;

the first and second interior chutes each having a position-adjustable chute entry gate and a position-adjustable chute exit gate;

164 f) Adjusting each of the position-adjustable chute entry gates and position-adjustable chute exit gates at least between a first position and a second position, the first position of the respective exit gates creating an opening allowing animals to exit respective interior chutes and pass to the first animal pen, the second position of the respective exit gates creating an opening allowing animals to exit respective interior chutes and pass to the second animal pen or directing the animals to the first or second main animal exit halls;

166 g) Routing a first group of the one or more animals from the first exit platform section into the first animal pen having a first plurality of animal stalls arranged in herringbone pattern; and

168 h) Routing a second group of the one or more animals from the second exit platform section to a second animal pen having a second plurality of animal stalls arranged in herringbone pattern.

FIG. 15 (Continued)

ROTARY PARLOR ANIMAL ENTRY AND EXIT SYSTEMS

BACKGROUND INFORMATION

Technical Field

The present disclosure relates to rotary parlors (systems) and methods of using same in dairy farming. In particular, the present disclosure relates to arrangements for housing, milking, treating and/or inspecting a large number of milking animals, and to methods for milking and treating and/or inspecting animals therein.

Background Art

Rotary milking parlors and methods of using same are used in the animal milking industry. Despite the apparent convenience of known rotary milking parlors, problems remain. Recurring issues include health of animals, in particular mastitis and other health issues in milk cows. In addition to diseases, animal status in terms of birthing calves is an important issue for the dairy farmer and of course the animal. Unhealthy animals potentially reduce milk volume produced and/or quality of milk produced. It would be advantageous to provide rotary milking parlors and entry/exit systems including appropriate paths, pens, and/or corrals for same that reduce or avoid health issues associated with conventional platforms and entry/exit systems. The entry and exit systems, pens, corrals, rotary milking parlors employing same, and methods of using same of the present disclosure are directed to these needs.

SUMMARY

In accordance with the present disclosure, systems including rotary milking parlors, entry and exit pens and/or corrals, paths between same, and methods using same are described which reduce or overcome many of the faults of previously known systems and methods. Systems of the present disclosure provide efficient, uniform, and effortless milking, treatment, and inspection while using rotary milking parlors. Systems of the present disclosure are designed for rotary platforms with animal milking times per stall between 3.5 and 6 minutes, while providing superior treatment, inspection, and routing of herds and sub-herds (portions of herds) pre- and post-milking. Systems and methods of the present disclosure feature movement of one or more gates that work in conjunction with the rotary parlor rotation rate.

A first aspect of the disclosure are systems comprising:

a) a rotary parlor comprising a rotatable annular platform (sometimes referred to herein as a rotary platform) having a plurality of milking stalls and a stationary support (preferably annular) concentric therewith;

b) a first animal pen having a first plurality of animal stalls arranged in herringbone pattern (for example, for palpation);

c) a second pen having a second plurality of animal stalls arranged in herringbone pattern (for example, for treatment), in certain embodiment in series with, and in certain embodiments in parallel with the first animal pen;

d) a rotary parlor entry platform having entry a converging fencing section to force animals to move from a holding pen into consecutive ones of the plurality of milking stalls at an angle, the entry platform having a distal edge adjacent a periphery of the rotary parlor; and e) a rotary parlor exit platform having a proximal edge adjacent the periphery of the rotary parlor, and exterior exit fencing and interior exit fencing, the interior exit fencing having a V-section dividing the rotary parlor exit platform into first and second exit platform sections, the first exit platform section further divided into a first main animal exit hall and a first interior chute, the second exit platform section further divided into a second main animal exit hall and a second interior chute, the second main exterior animal exit hall parallel to the first main exterior animal exit hall, and the second interior chute parallel with the first interior chute;

f) the first and second interior chutes each having a position-adjustable chute entry gate and a position-adjustable chute exit gate, each position-adjustable exit gate being adjustable at least between a first position and a second position, the first position of the respective exit gates creating an opening allowing animals to exit respective interior chutes and pass to the first animal pen, the second position the respective exit gates creating an opening allowing animals to exit respective interior chutes and pass to the second animal pen or directing the animals to the first or second main animal exit halls.

Certain system embodiments may further comprise interior fencing and position-adjustable gates allowing animals to pass through the first and/or second chutes and bypass the first animal pen having a first plurality of animal stalls arranged in herringbone pattern, and move into second pen having a second plurality of animal stalls arranged in herringbone pattern. Certain system and methods may further comprise synchronizing speed of rotation of the annular rotatable platform with actuation of the position-adjustable chute entry gates and the position-adjustable chute exit gates between the first position and the second position using one or more programmable logic controllers.

Certain system embodiments may comprise only one internal exit chute. In these embodiments, the internal chute may be deemed a single 3-way sort system, where all animals enter the exit chute, and each animal may be directed by a position-adjustable exit gate either to the main animal exit, to a first treatment or inspection pen, or to a second, different treatment or inspection pen, depending on the needs of each animal.

Certain system embodiments may comprise only two, parallel internal exit chutes. In these embodiments, each internal chute may be deemed a single 3-way sort system, where animals enter either the respective first or second exit chute, and each animal may be directed by an adjustable exit gate either to the first or second primary exit hall, to a first treatment or inspection pen, or to a second, different treatment or inspection pen, depending on the needs of each animal.

Certain system embodiments may comprise two internal exit chutes arranged in series. In these embodiments, a first internal chute may be deemed a 2-way sort chute, where all animals enter and pass through the first internal chute, and each animal may be directed by a position-adjustable exit gate either to exit to the first or second primary exit hall, or to a second internal chute, where the second internal chute may be deemed a 3-way sort chute treatment or inspection pen, where each animal may be directed by another adjustable exit gate either to an exit hall, or to one or more treatment or inspection pens, depending on the needs of each animal.

As used herein the phrase "position-adjustable gate" means a solid or tubular framed door configured to be swung left and right as on hinges, and otherwise positioned as directed manually by a worker, or by commands from a controller, which as further discussed herein may be one or more programmable logic controllers (PLCs) receiving (among other signals) signals from electronic, magnetic, or acoustic transducers. In addition, the gates and fencing may be linear or curvilinear, and may be repositioned as desired; the actuators for the gates may be electrical, hydraulic, or pneumatic if not manually moved.

Rotary milking parlors useful in systems and methods of the present disclosure include a rotatable annular platform sufficient to support multiple animals, the rotatable annular platform rotatable about an axis of rotation and having a plurality of stalls in which the animals are to be milked, the stalls arranged about a first perimeter of the rotatable platform, and a fixed annular support platform having a second perimeter the same as the first perimeter. Certain rotary milking parlors include those described in assignee's copending U.S. patent application Ser. No. 19/287,238, filed Jul. 31, 2025, wherein the rotatable annular platform is magnetically levitated above the fixed annular support platform with force sufficient to levitate the rotatable annular platform when some or all stalls have animals present therein. The Ser. No. 19/287,238 application is incorporated by reference in its entirety herein.

In certain embodiments the fences and gates may comprise tubular materials, and in certain embodiments materials making the systems durable, lightweight for easy handling, yet robust enough for long-lasting performance. Suitable materials include aluminum, steel, galvanized steel, and other lightweight metals. Materials and construction are designed to allow the systems of the present disclosure to be used in any environment and perform under extreme conditions like dust, water, manure, and chemicals.

Certain system embodiments may comprise an audiovisual (AV) tower, either attached to or separate from an interior or exterior fence or gate. In certain embodiments, the AV tower may comprise a smart status indicator, providing real-time updates for effective monitoring. Certain system embodiments may comprise real-time monitoring and analysis of parameters, with detailed logs of active hours, animals serviced or inspected, and the like, utilizing one or more motion sensors, cameras, acoustic transducers, pressure transducers, temperature transducers, (sensors and transmitters), and one or more PLCs. As used herein a "transducer" is a device that functions both as a sensor and transmitter. Certain embodiments may comprise proactive fault detection, for example, one or more motion detectors/transducers detecting a reduced or non-existent animal flow through the entry and/or exit platforms, with real-time error visualization for fast troubleshooting and uninterrupted operation. The one or more PLCs may be programed to allow one or more of: "smart" remote connectivity, such as artificial intelligence (AI) and/or human technical support and maintenance without the need for physical intervention; automatic rotary platform speed or gate opening/closing speed adjustment, adapting to platform speed for seamless operation; and/or advanced control and safety, for example, user-type access to parameters and detailed modification logs.

A second aspect of the disclosure are methods comprising (or consisting essentially of, or consisting of):

a) routing one or more animals to an entry platform having a converging fencing section, the converging fencing section directing animals to move from a holding pen into stalls on an annular rotatable platform of a rotary milking parlor sufficient to support the one or more animals, the stalls arranged about a first perimeter of the annular rotatable platform, the entry platform having a distal edge adjacent a periphery of the rotary parlor;

b) rotating the annular rotatable platform about an axis of rotation while milking the one or more animals, the rotating of the annular rotatable platform being above a fixed annular support platform having a second perimeter the same as the first perimeter;

c) controlling speed and direction of rotation of the annular rotatable platform using a platform controller (in certain embodiments, one or more PLCs);

d) sensing, using a magnetic sensor/transducer positioned on the annular rotatable platform, speed and direction of rotation of the rotatable annular platform;

e) routing the one or more animals to an exit platform having a diverging fencing section, the diverging fencing section directing animals to move from the stalls of the rotary platform onto the exit platform, the exit platform having a proximal edge adjacent the periphery of the rotary parlor, and exterior exit fencing and interior exit fencing;

f) routing the one or more animals onto first and second exit platform sections;

g) routing a first group of the one or more animals from the first exit platform section to a first animal pen having a first plurality of animal stalls arranged in herringbone pattern (for example, for palpation);

h) routing a second group of the one or more animals from the second exit platform section to a second pen having a second plurality of animal stalls arranged in herringbone pattern (for example, for treatment).

In certain embodiments the first group of the one or more animals may be routed from the first exit platform section to the first animal pen having a first plurality of animal stalls arranged in herringbone pattern (for example, for palpation), followed by routing the same group of the one or more animals from the first animal pen to a second pen having a second plurality of animal stalls arranged in herringbone pattern (for example, for treatment).

Certain methods may comprise routing animals from the first exit platform section into a first main animal exit hall and/or into a first interior chute. Certain embodiments may comprise routing a second group of animals from the second exit platform section into a second main animal exit hall and/or into a second interior chute, the second main exterior animal exit hall parallel to the first main exterior animal exit hall, and the second interior chute parallel with the first interior chute.

Rotary platforms useful in the present systems and methods support from about 500 to about 1500 kg per stall, plus a fully grown milking cow per stall. If magnetically levitated, a rotary platform of 60 or more stalls needs magnetic energy sufficient to support an overall weight (if the animals are cows, frames, brackets, bails and associated equipment (teat cups, hoses)) of about 60 tons or more. If the weight of platform, animals, and equipment thereon exceeds the capacity of the magnet elements to levitate some or all of the platform, support rollers may be provided in some embodiments configured to support the platform, animals, and equipment thereon.

These and other features of the systems and methods of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein, and vice versa. It should be further understood that wherever the term "comprising" is used herein, other embodiments where the term "comprising" is substituted with "consisting of" are explicitly disclosed herein, and vice versa. Moreover, the use of negative limitations is specifically contemplated; for example, certain systems may include rare earth magnets, while other systems may be devoid of these.

BRIEF DESCRIPTION OF THE DRAWINGS

The manner in which the objectives of this disclosure and other desirable characteristics can be obtained is explained in the following description and attached drawings in which.

Figure 1:
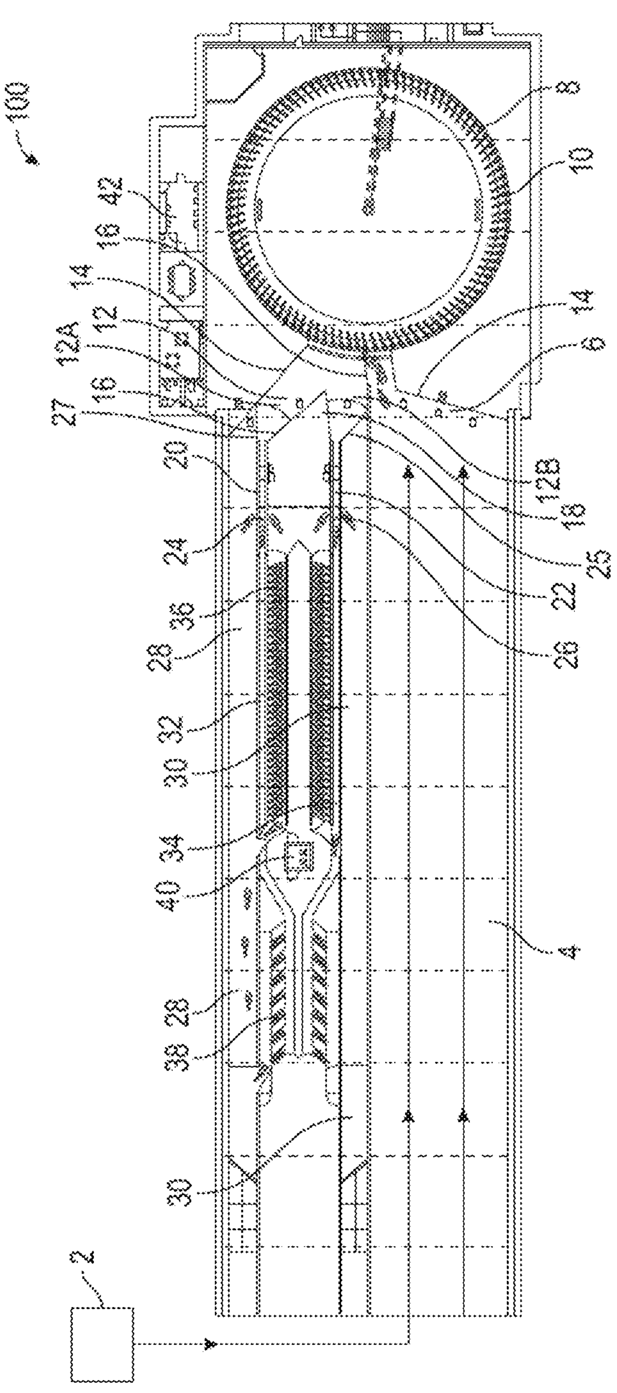
FIG. 1 is a schematic plan view of one system embodiment of the present disclosure, illustrating with linear arrows the cows moving from a barn to an entry platform prior to entering stalls of a rotary milking platform.

It is to be noted, however, that the appended drawings are not to scale, and illustrate only typical embodiments of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the systems, rotary parlors, and methods of the present disclosure. However, it will be understood by those skilled in the art that the apparatus, systems and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=RL+k*(RU-RL)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

The term "comprising" and derivatives thereof is not intended to exclude the presence of any additional component, step or procedure, whether or not the same is disclosed herein. In order to avoid any doubt, all systems, processes, and compositions claimed herein through use of the term "comprising" may include any additional component, step, additive, adjuvant, or compound whether monomeric, oligomeric, polymeric or otherwise, unless stated to the contrary.

In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As mentioned herein, despite the apparent convenience of the known rotary milking parlors, problems remain. Recurring issues include health of animals, in particular mastitis and other health issues in milk cows. In addition to diseases, animal status in terms of birthing calves is an important issue for the dairy farmer and of course the animal. Unhealthy animals potentially reduce milk volume produced and/or quality of milk produced. It would be advantageous to provide rotary milking parlors and entry/exit systems including appropriate paths, pens, and/or corrals for same that reduce or avoid health issues associated with conventional rotary platforms and entry/exit systems. The entry and exit systems, pens, corrals, rotary milking parlors employing same, and methods of using same of the present disclosure are directed to these needs.

Referring now to the drawing figures, FIG. 1 is a schematic plan view of one system embodiment 100 of the present disclosure, illustrating with linear arrows the cows moving from a barn 2, through and entry hall 4 to an entry platform 6 prior to entering stalls 10 of a rotary milking platform 8. FIG. 1 also illustrates several other components, including: an exit platform 12; exterior fencing 14; interior fencing 16; a V-section 18 of interior fencing 16; a first interior chute 20; a second interior chute 22; a position-adjustable exit gate 24 on chute 20; a position-adjustable exit gate 26 on chute 22; a first main exit hall 28; a second main exit hall 30; a first interior bypass hall 32; a second interior bypass hall 34; a first herringbone pen 36; a second herringbone pen 38; and a veterinary station 40. System embodiment 100 further includes one or more programmable logic controllers 42 that are programmed to synchronize speed of rotation of rotary milking platform 8 with actuation of position-adjustable chute exit gates 24, 26, between a first position (for example, closed) and the second position (for example, open) and vice versa. Programmable logic controllers 42 may, in other embodiments, be programmed to synchronize speed of rotation of rotary milking platform 8 with actuation of position-adjustable chute exit gates when present.

Figure 2:
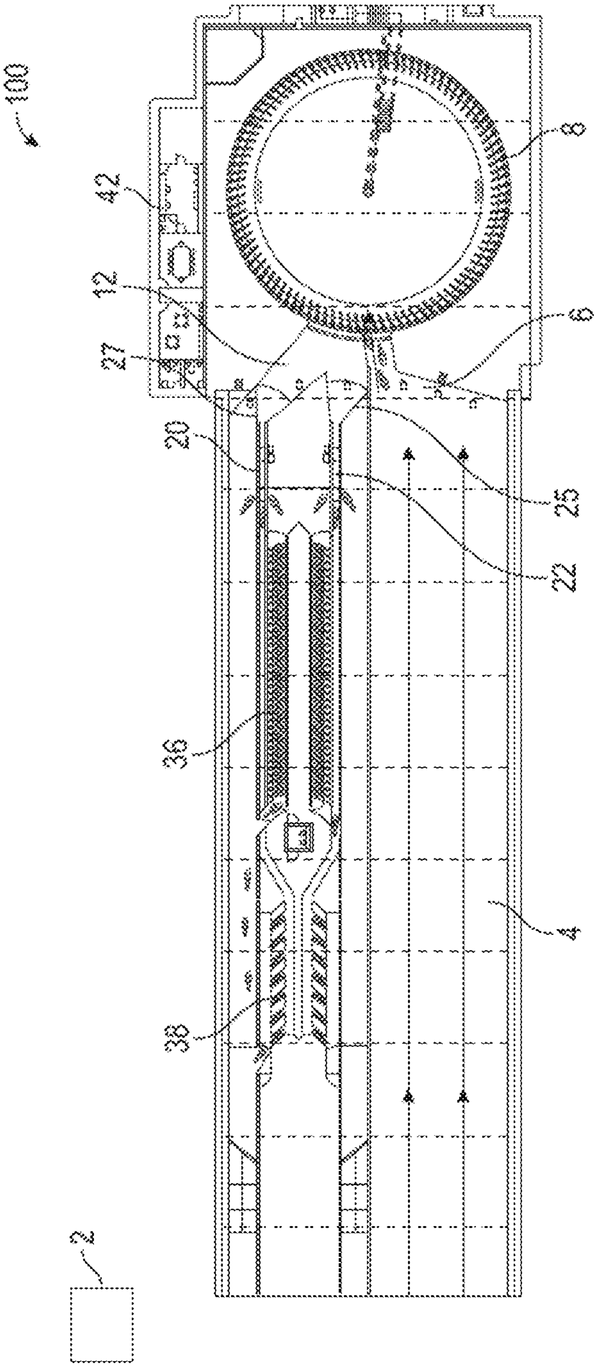
FIG. 2 is a schematic plan view of the system embodiment of FIG. 1, illustrating cows traversing the entry platform and entering the rotary milking platform through a converging section.
Figure 3:
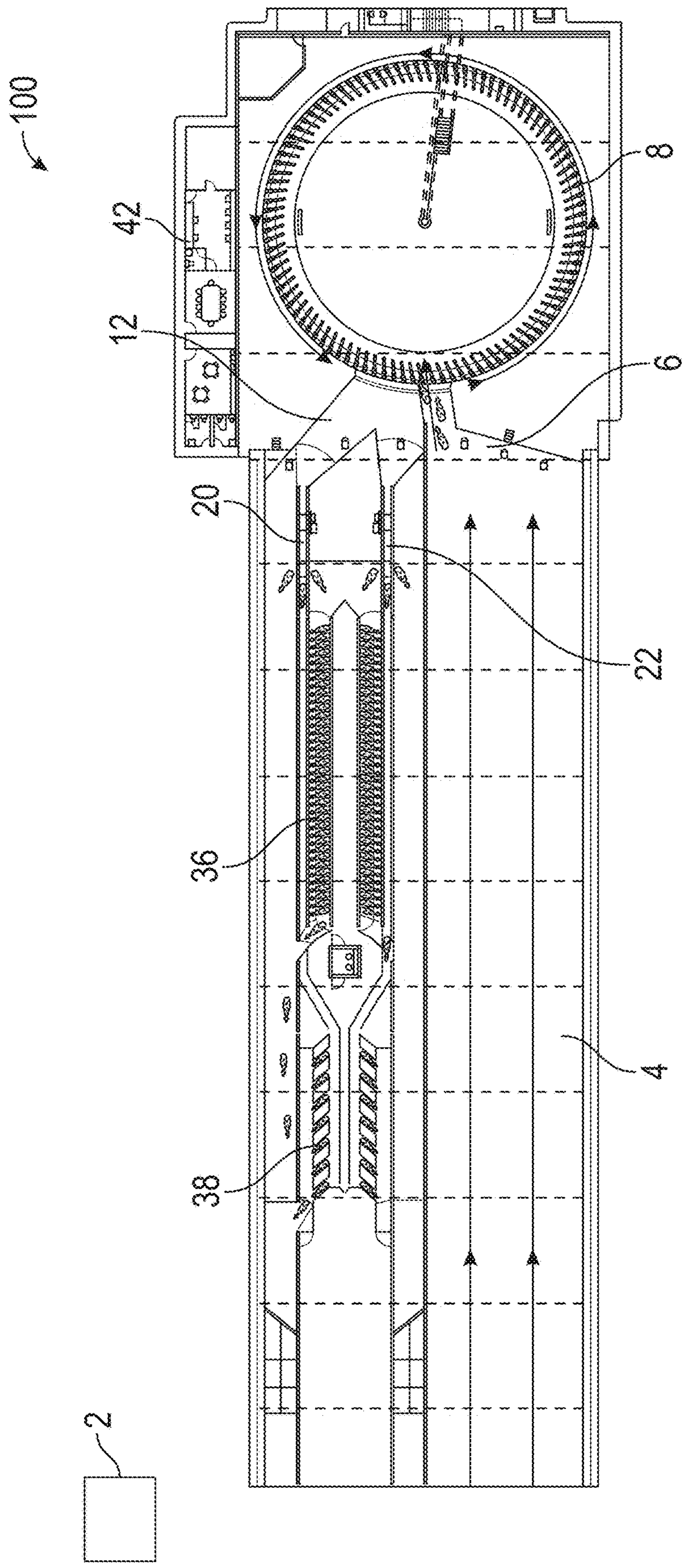
FIG. 3 is a schematic plan view of the system embodiment of FIG. 1, illustrating cows traversing around the rotary milking platform (circular arrow) while in respective stalls.
Figure 4:
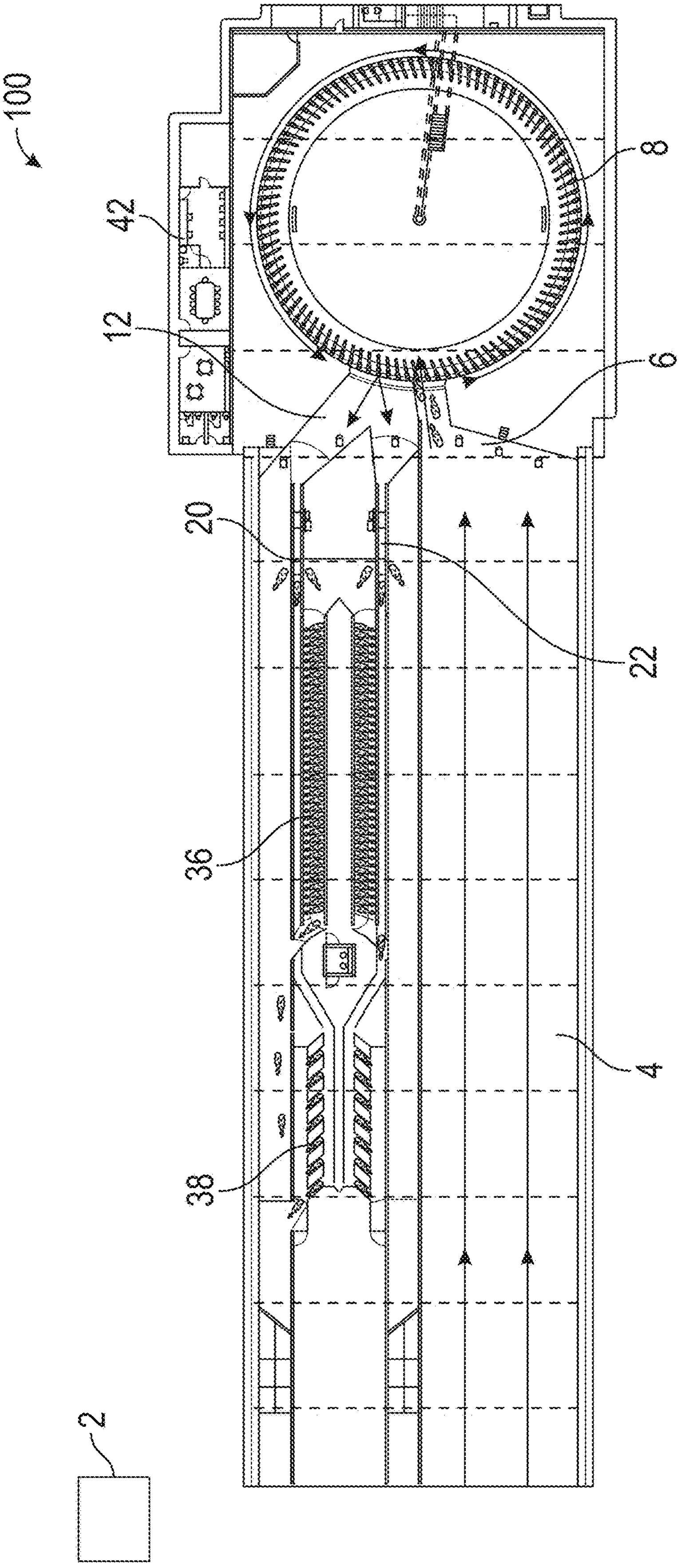
FIG. 4 is a schematic plan view of the system embodiment of FIG. 1, illustrating with arrows cows traversing the diverging exit platform.
Figure 5:
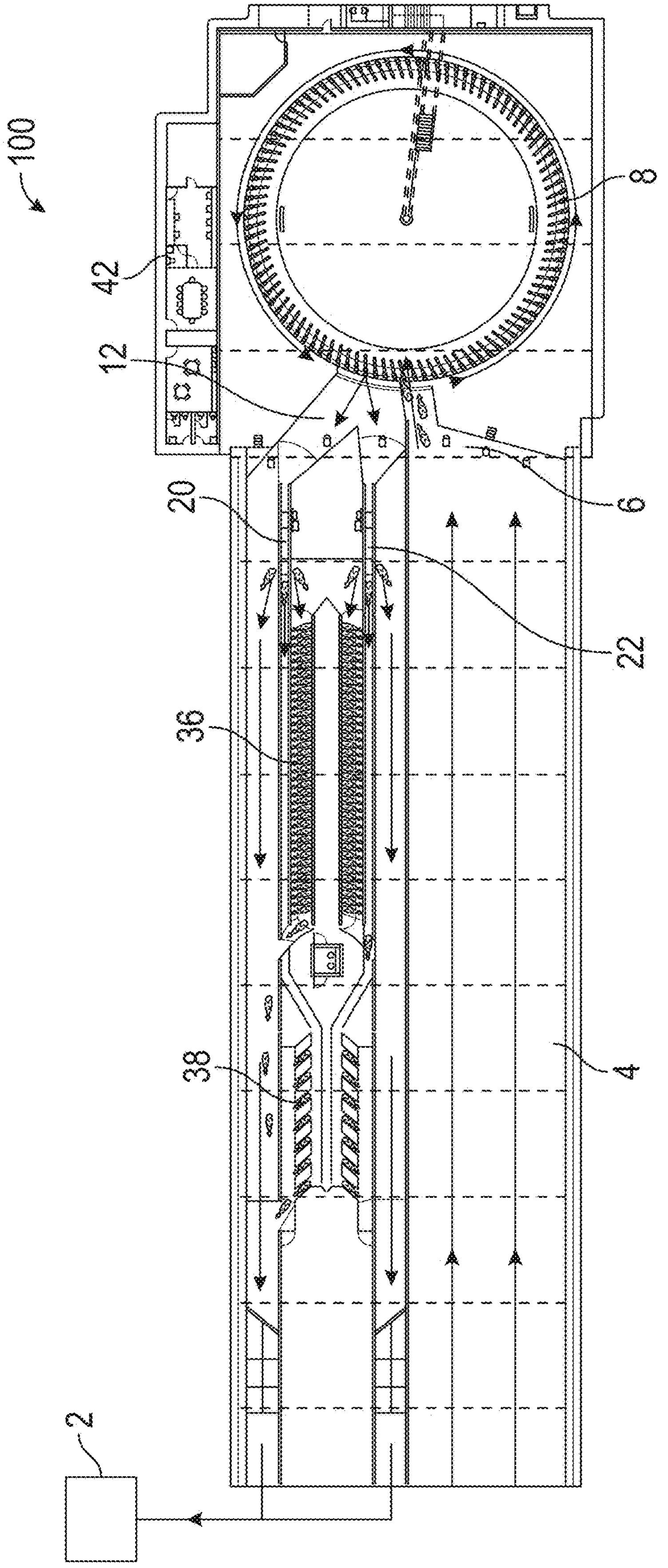
FIG. 5 is a schematic plan view of the system embodiment of FIG. 1, illustrating cows being directed by a V-section of interior fencing to two interior chutes, each interior chute having a position-adjustable exit gate from which the cows may be directed to a main exit hall, to a first herringbone pen, and/or to a second herringbone pen, and ultimately back to the barn.
Figure 6:
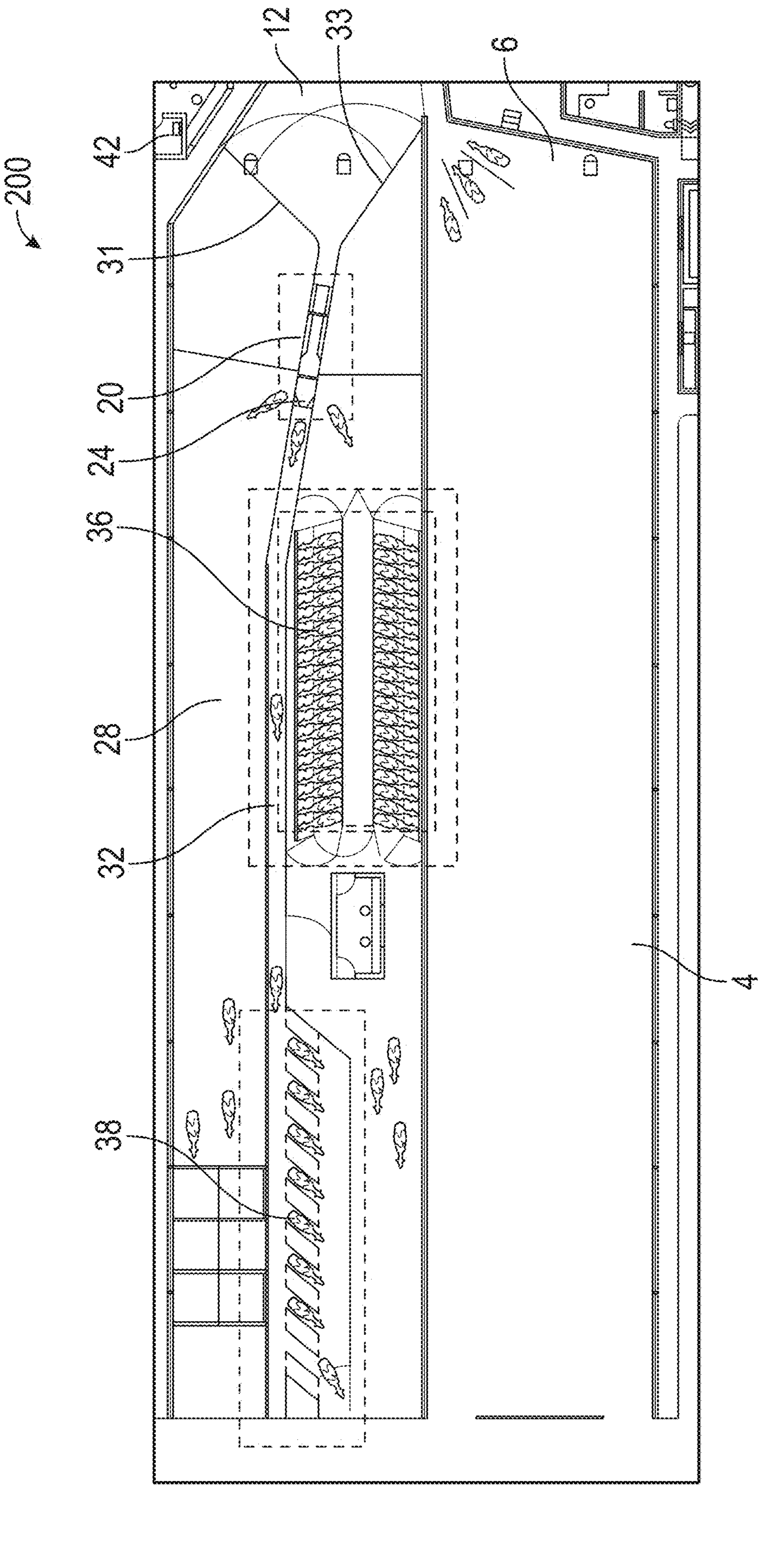
FIGS. 6-10 are schematic plan view illustrations of five system and method embodiments of the present disclosure.
Figure 7:
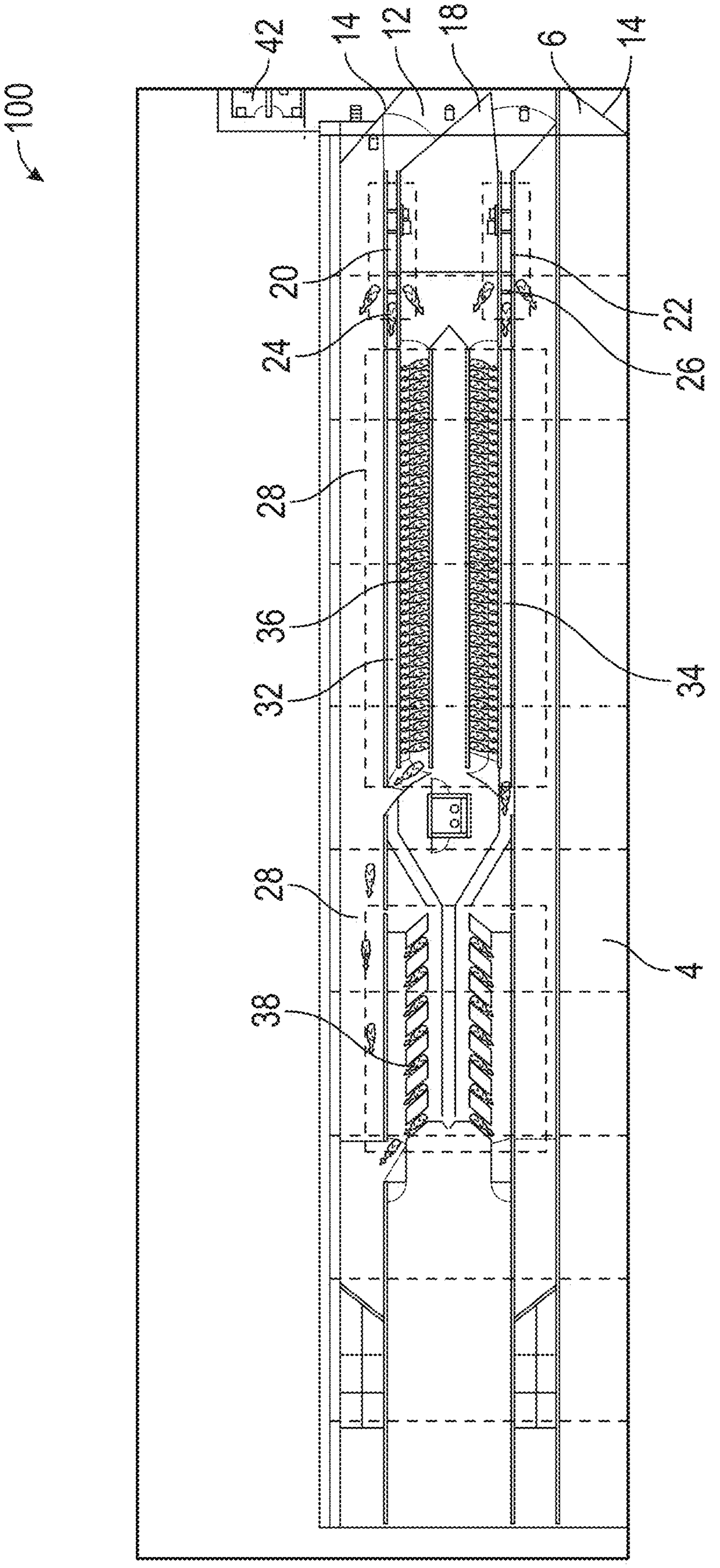
Figure 8:
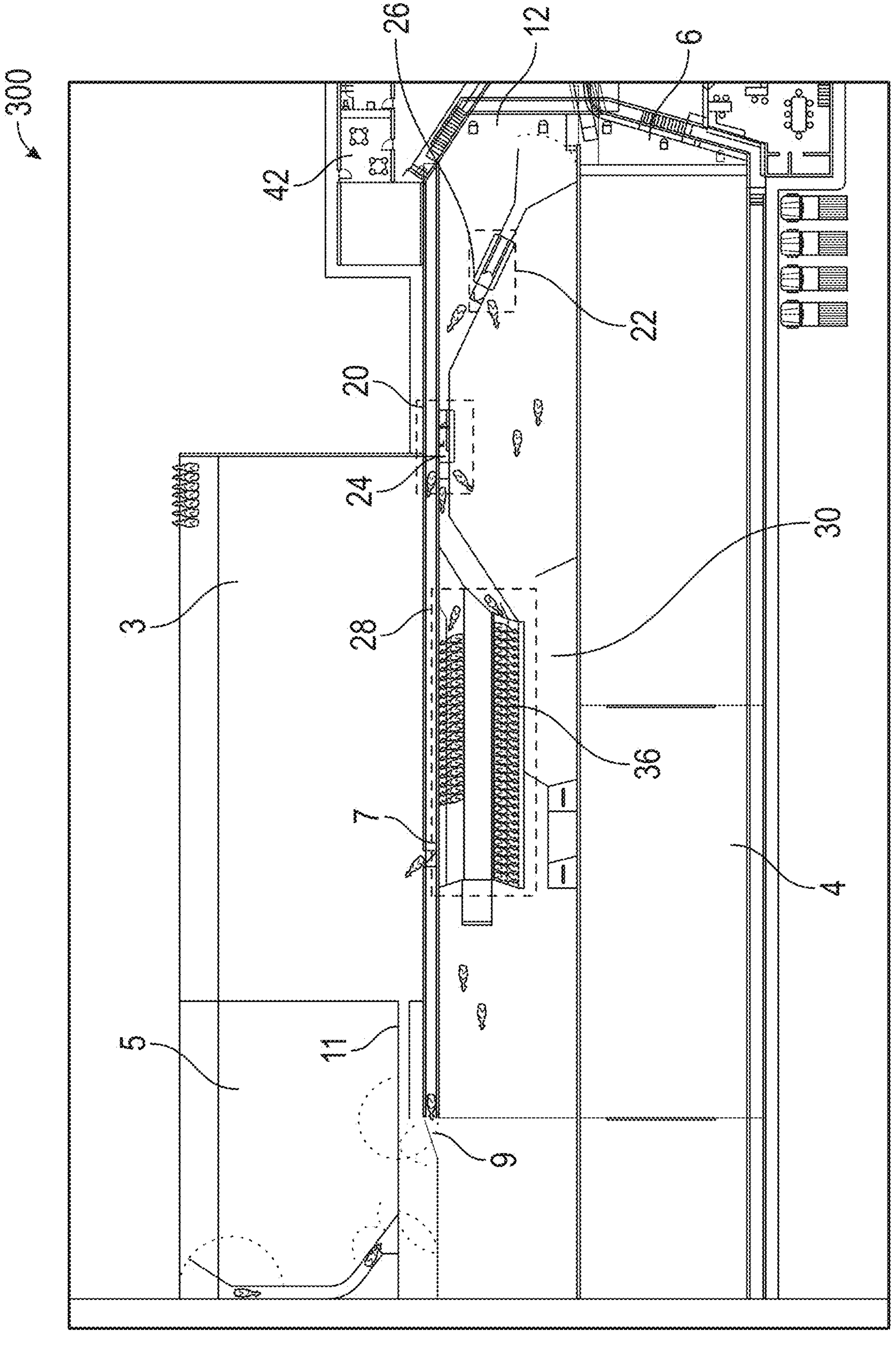

The benefits of these components and embodiment 100 are now explained by reference to FIGS. 2-5. FIG. 2 is a schematic plan view of embodiment 100, illustrating cows traversing entry platform 6 and entering rotary milking platform 8 through a converging section of entry platform 6 formed by external fencing. FIG. 3 illustrates cows traversing around rotary milking platform 8 (circular arrow) while in respective stalls 10. FIG. 4 illustrates with arrows cows traversing exit platform 12; and FIG. 5 illustrates schematically cows being directed by V-section 18 of interior fencing 16 to two interior chutes 20, 22, each interior chute 20, 22 having a position-adjustable exit gate 24, 26, respectively, from which cows may be directed to main exit hall 28, to first herringbone pen 36, and/or to second herringbone pen 38, and ultimately back to barn 2. First herringbone pen 36 may be a palpation pen, and second herringbone pen 38 may be a special treatment area, for mastitis or other condition of the cows. FIG. 7 is a more detailed schematic close-up plan view of embodiment 100.

Figure 9:
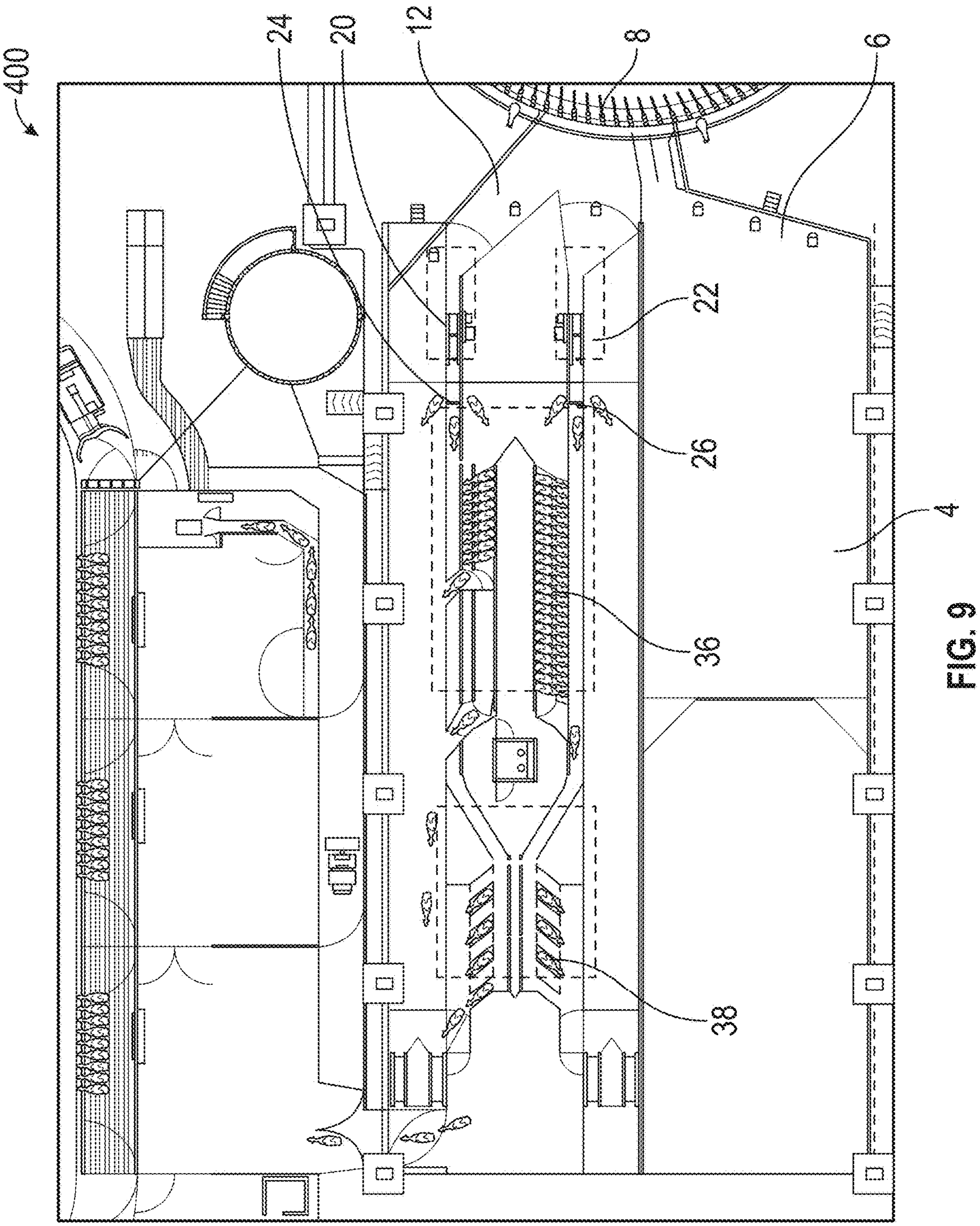
Figure 10:
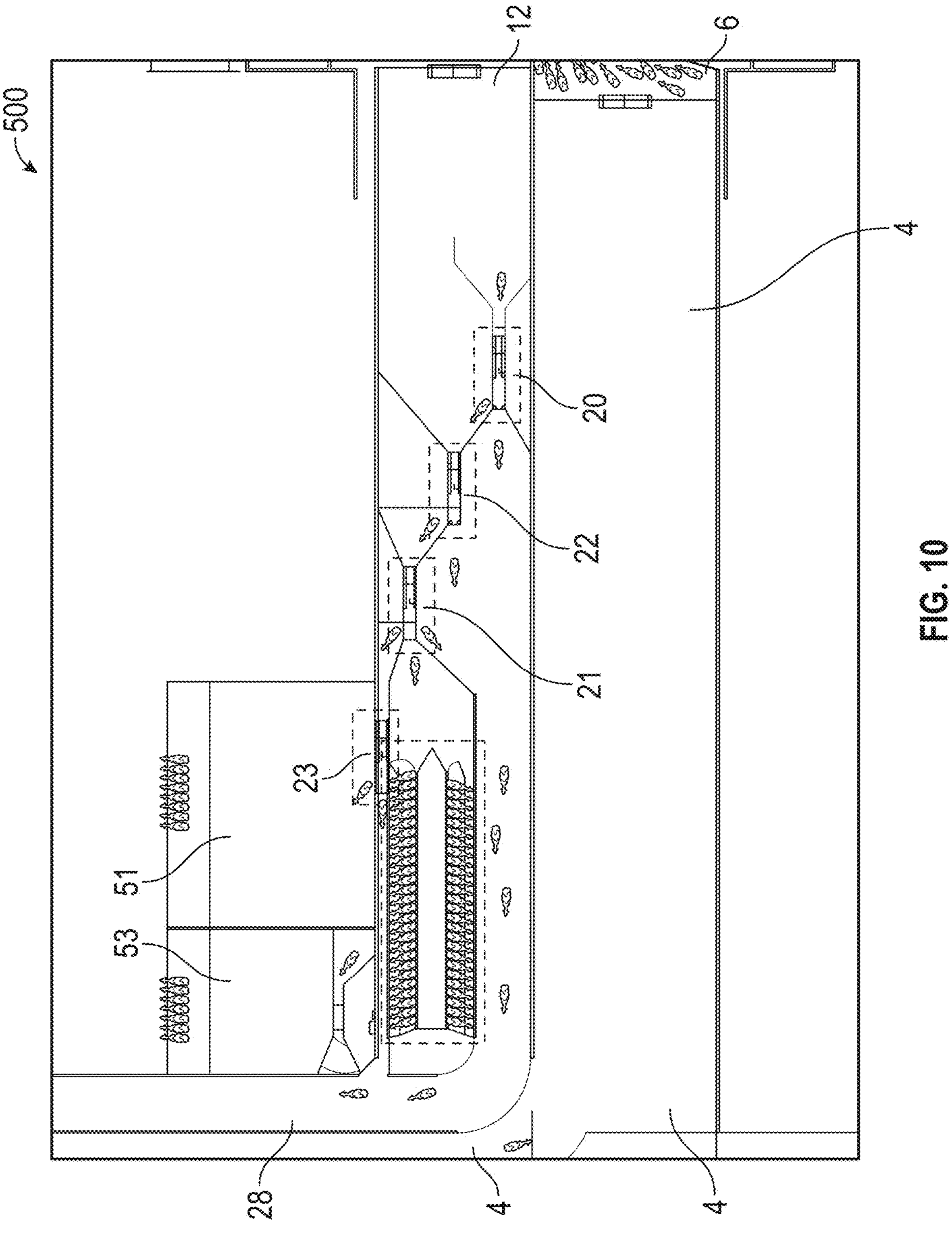
Figure 11:
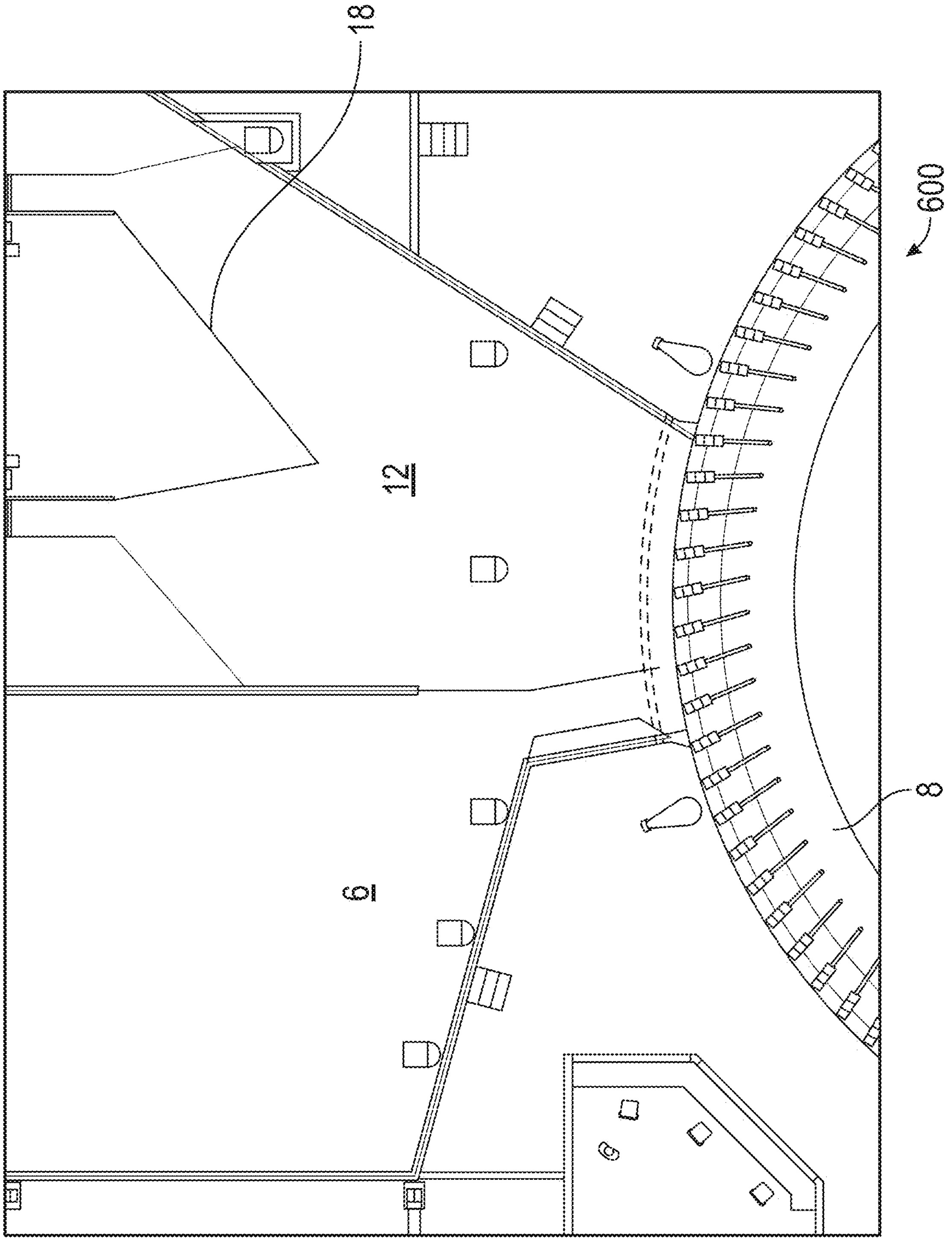
FIGS. 11-14 are schematic plan view illustrations of further details of four options of entry platform embodiments of the present disclosure.
Figure 12:
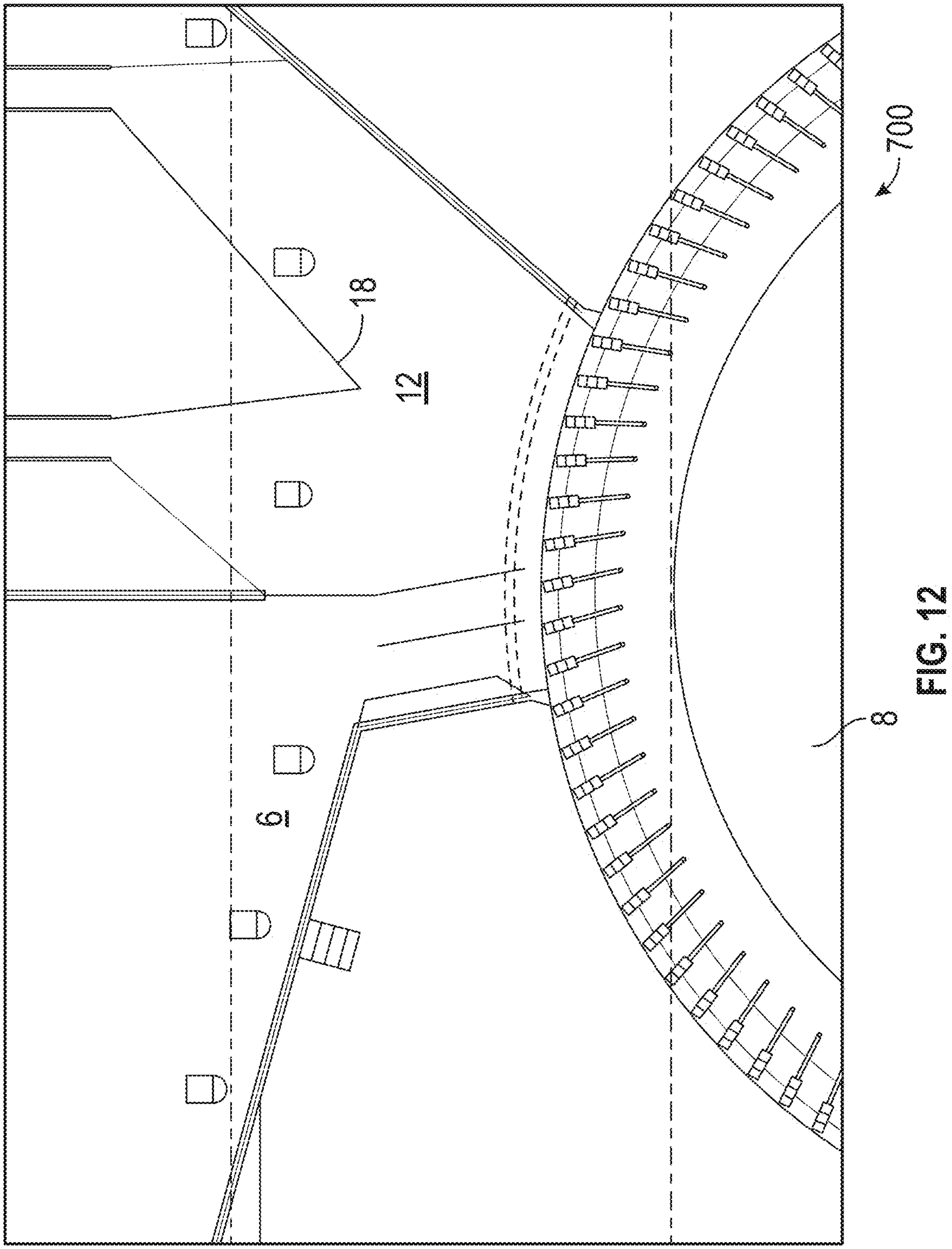
Figure 13:
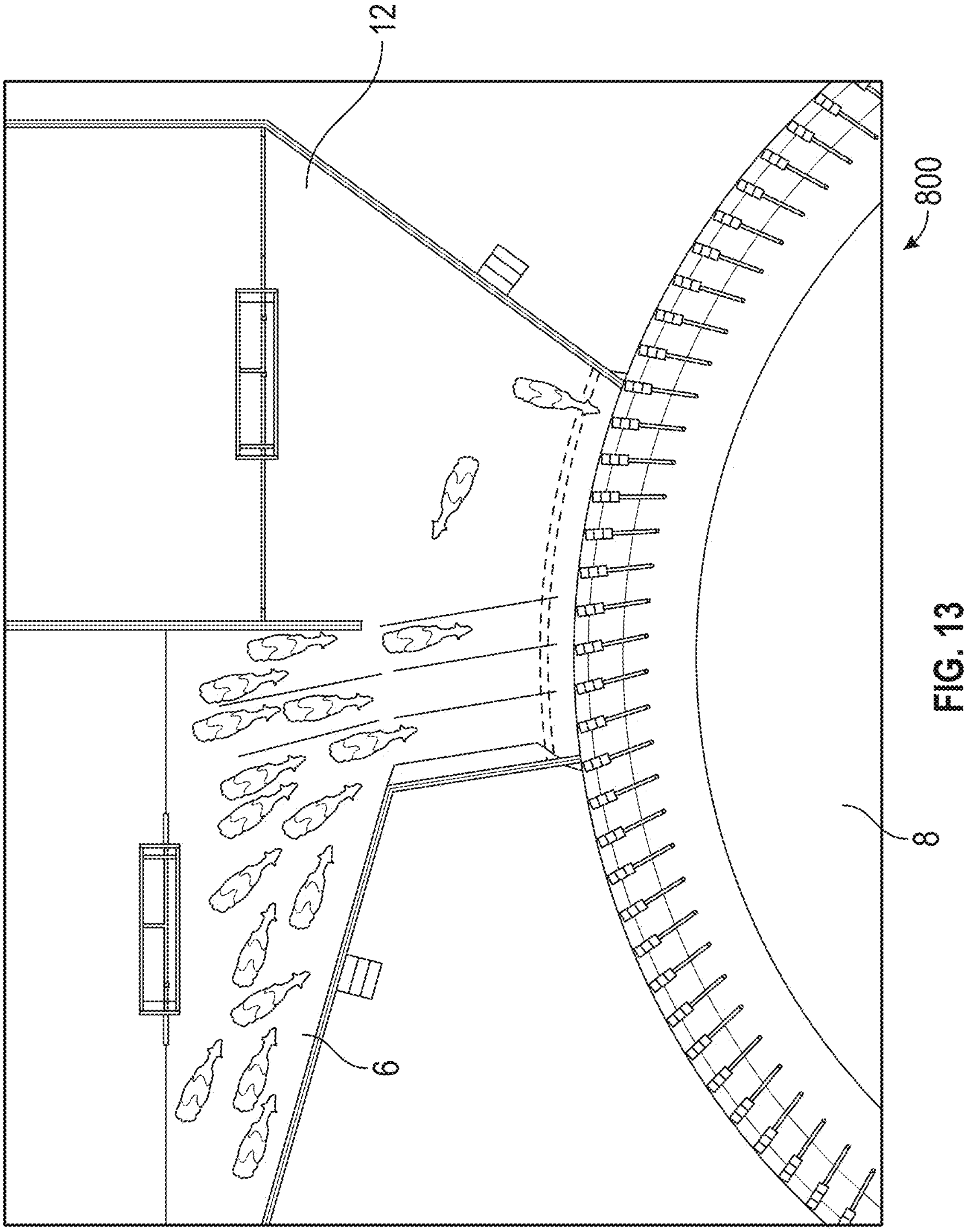
Figure 14:
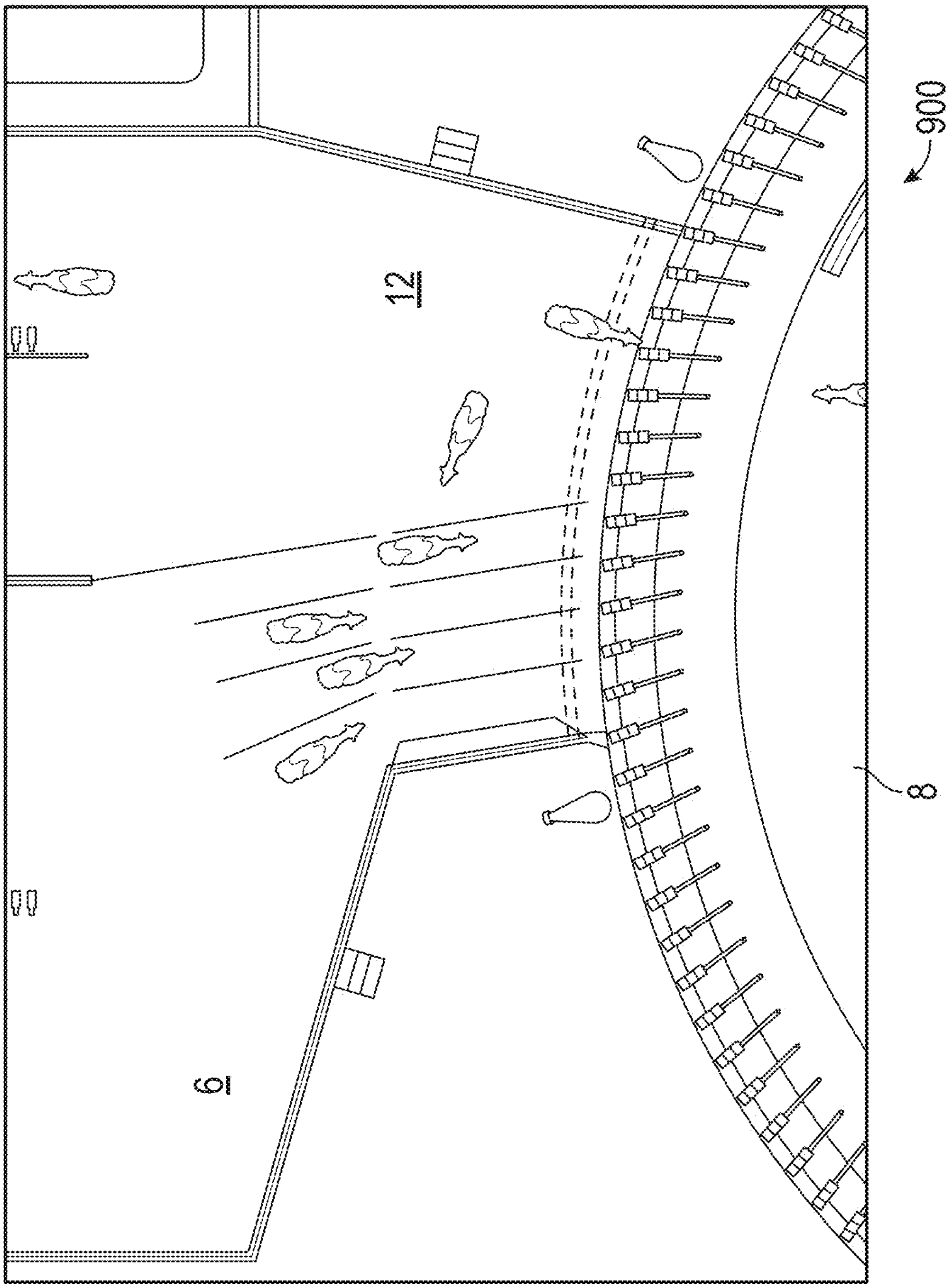

FIGS. 6-10 are schematic plan view illustrations of five system embodiments 100, 200, 300, 400, and 500 of the present disclosure. Embodiment 200 includes only one interior chute 20 and a single position-adjustable gate 24, and further includes two additional position-adjustable gates 31, 33 that when operated allow cows to move from exit platform 12 either toward chute 20 (gates 31, 33 both swung open), top move into first herringbone pen 36 (both gates 31, 33 swung to the left or upwards in FIG. 6), or to exit through exit hall 28 (when both gates 31, 33 are swung to the right, or downward in FIG. 6). To direct cows into chute 20, gate 31 may be swung open (to the left, or upward in FIG. 6) and gate 33 swung open to the right (downward in FIG. 6). Embodiment 300 (FIG. 8) allows similar options, while employing two sorting chutes 20, 22, where chute 20 includes a 3-way position-adjustable exit gate 24, and chute 22 includes a 2-way position-adjustable exit gate 26. Embodiment 300 includes a special treatment area or pen 3 and a sort pen 5, as well as gates 7, 9, and another interior chute 11 that allows cows to be routed back from sort pen 5 back into special treatment pen 3. Embodiment 400 (FIG. 9) features a combination of components from embodiments 100 and 300, plus additional features as illustrated in FIG. 9. Embodiment 500 includes a total of four interior chutes 20, 21, 22, and 23 arranged as illustrated, where chutes 20 and 22 are each 2-way sorting chutes arranged in series, chute 21 is a 3-way sorting chute positioned in series after (downstream of) chute 22, and chute 23 is another 3-way sorting chute positioned after (downstream of) chute 21. Healthy cows may exit directly through exit hall 28 and allowed to go back to their barn (not illustrated in FIG. 10), while 2-way sorting chute 23 allows cows to be directed into a sorting pen 51 and/or into a hoof trim pen 53 as deemed necessary by the farmer.

FIGS. 11-14 are schematic plan view illustrations of further details of four options of entry platform embodiments 600, 700, 800, and 900 of the present disclosure.

Figure 15:
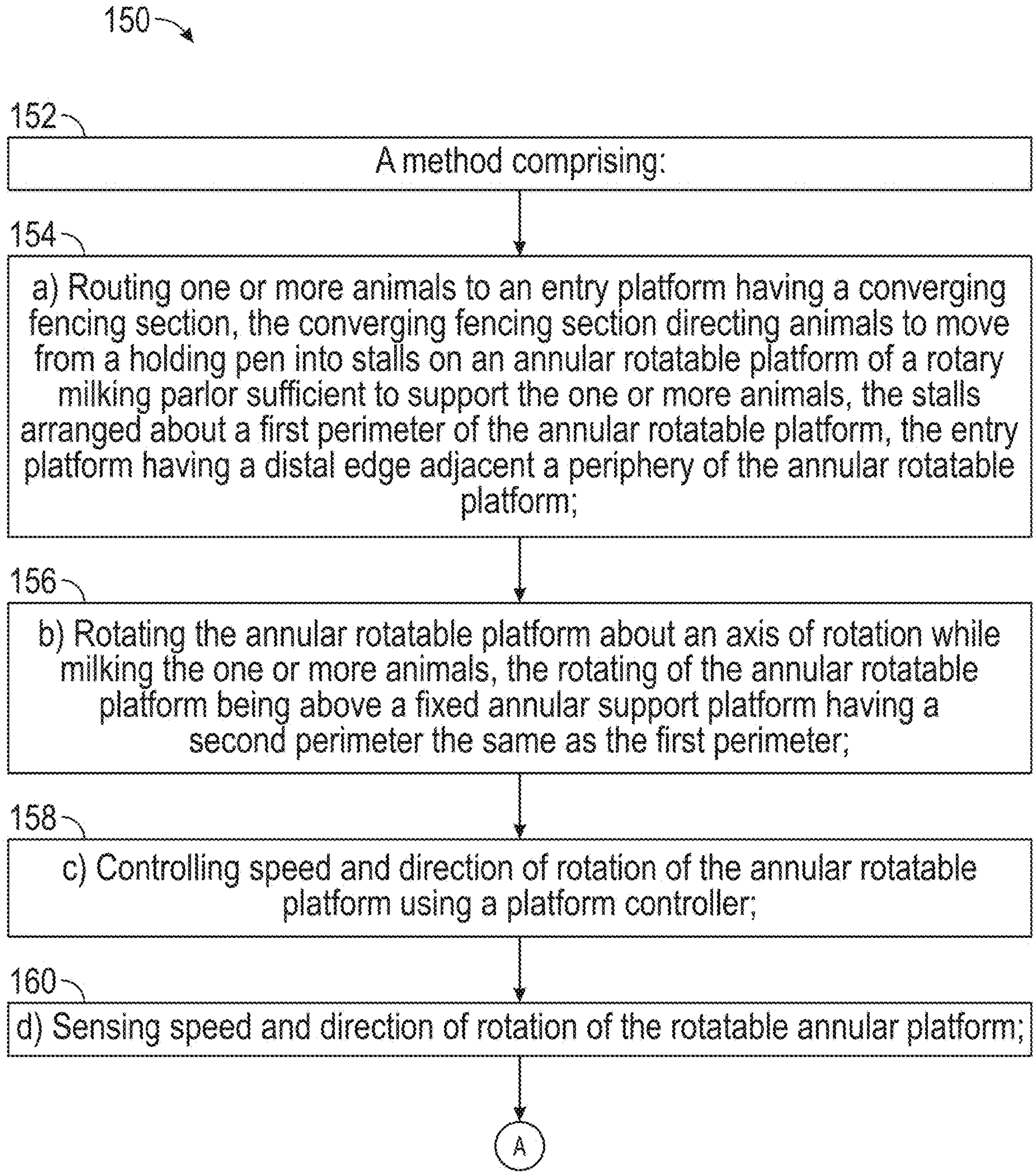
FIG. 15 is a logic diagram of one method embodiment in accordance with the present disclosure.

FIG. 15 is a logic diagram of one method embodiment 150 in accordance with the present disclosure (box 152). Method embodiment 150 includes the steps of routing one or more animals to an entry platform having a converging fencing section, the converging fencing section directing animals to move from a holding pen into stalls on an annular rotatable platform of a rotary milking parlor sufficient to support the one or more animals, the stalls arranged about a first perimeter of the annular rotatable platform, the entry platform having a distal edge adjacent a periphery of the annular rotatable platform (box 154);

rotating the annular rotatable platform about an axis of rotation while milking the one or more animals, the rotating of the annular rotatable platform being above a fixed annular support platform having a second perimeter the same as the first perimeter (box 156);

controlling speed and direction of rotation of the annular rotatable platform using a platform controller (in certain embodiments, one or more PLCs) (box 158);

sensing speed and direction of rotation of the rotatable annular platform (box 160);

e) routing the one or more animals onto an exit platform having a diverging fencing section, the diverging fencing section directing animals to move from the stalls of the annular rotary platform onto the exit platform, the exit platform having a proximal edge adjacent the first periphery of the annular rotary platform, and exterior exit fencing and interior exit fencing, the exit platform having first and second exit platform sections, the interior exit fencing having a V-section dividing the rotary parlor exit platform into first and second exit platform sections, the first exit platform section further divided into a first main animal exit hall and a first interior chute, the second exit platform section further divided into a second main animal exit hall and a second interior chute;

the first and second interior chutes each having a position-adjustable chute entry gate and a position-adjustable chute exit gate (box 162);

f) adjusting each of the position-adjustable chute entry gates and position-adjustable chute exit gates at least between a first position and a second position, the first position of the respective exit gates creating an opening allowing animals to exit respective interior chutes and pass to the first animal pen, the second position of the respective exit gates creating an opening allowing animals to exit respective interior chutes and pass to the second animal pen or directing the animals to the first or second main animal exit halls (box 164);

g) routing a first group of the one or more animals from the first exit platform section into the first animal pen having a first plurality of animal stalls arranged in herringbone pattern (box 166); and h) routing a second group of the one or more animals from the second exit platform section to a second animal pen having a second plurality of animal stalls arranged in herringbone pattern (box 168).

The rotary parlor control schemes described in assignee's co-pending application Ser. No. 19/287,238 may be useful in systems and methods of the present disclosure. As explained in the '238 application, a rotary parlor process control scheme may be employed including a platform controller interacting (via wired or wireless connections) with an actuator, a speed drive, and the rotary platform. A magnetic sensor senses speed and direction of rotation of rotary platform. The platform controller may also communicate with a power unit, which in turn independently actuates actuators connected to one or more position-adjustable gates described herein via compressed air lines, hydraulic lines, or electronic. Compressed air is preferred as dairy personnel are usually familiar with compressed air systems.

A master controller, such as a platform and gate controller, may be employed, but the disclosure is not so limited, as any combination of distributed controllers could be used. Controllers may be selected from PI controllers, PID controllers (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and transducers in real time or near-real time, and sending commands directly to control elements, and/or to local devices associated with control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the disclosure.

A feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

In certain embodiments, the systems of the present disclosure detect the direction of rotation of the rotary platform, in conjunction with the feedback given by the rotary parlor speed drive. The movement is concentric to the movement of the rotary platform. The systems of the present disclosure are adaptable to different characteristics of rotary parlors (i.e., they are not exclusive to wood rooms). The systems of the present disclosure work with milking stall times ranging from 6 seconds to 3.5 seconds per position. This means that one cow fully enters the platform in 3.5 to 6 seconds, and that one stall will be in the next stall's position within 3.5 to 6 seconds. In certain embodiments, the systems of the present disclosure utilize wireless functions for remote use.

Rotary milking platforms, fences, stalls (bails), chutes, and gates described herein may generally be made of steel, aluminum or other corrosion-resistant metal. Some fences, chutes, and/or gates may comprise engineered plastics, fill or unfilled, for example polypropylene, high-density polyethylene, ultra-high molecular weight-polyethylene, acetal polymers, and polytetrafluoroethylene. Fences and gates may be tubular (where "tubular" herein includes both hollow and solid tube-like structures, which may be round in cross-section or other cross-sectional shape).

Systems of the present disclosure may include teat and/or udder spray systems, such as disclosed in assignee's co-pending U.S. patent application Ser. No. 19/407,959, filed Dec. 3, 2025, incorporated herein by reference. In these embodiments, one method embodiment may comprise routing one or more animals into respective stalls on the annular rotatable platform sufficient to support the one or more animals, the stalls arranged about a first perimeter of the annular rotatable platform;

- rotating the annular rotatable platform about an axis of rotation while milking the one or more animals, the rotating of the annular rotatable platform being above a fixed annular support platform having a second perimeter the same as the first perimeter;
- controlling speed and direction of rotation of the annular rotatable platform using a platform controller (in certain embodiments, one or more PLCs);
- sensing, using a magnetic sensor/transducer positioned on the annular rotatable platform, speed and direction of rotation of the rotatable annular platform;
- transmitting the speed and direction of rotation from a magnetic sensor/transducer to the platform controller and a speed drive for an actuator for one or more position-adjustable spray wands configured to deliver a fluid automatically on command to the one or more animal's teats and/or udder.

Systems of the present disclosure may deliver chemical fluids in spray or mist form to teats and/or the entire animal udder, such as pre-wash and post-wash fluids (liquids), either while the animal is on the rotary platform, or in one of the treatment pens described herein. Chemicals that may be sprayed or misted include disinfectants, emollients, natural/organic fluids, sealants, antimicrobials for wound care, and the like, and mixtures and combinations of two or more of these. Suitable disinfectants include germicides such as iodine, broad-spectrum antibacterials such as chlorhexidine (commonly available as chlorhexidine gluconate or chlorhexidine acetate), acidified sodium chlorite (ASC), and hydrogen peroxide. Combined disinfectant/emollient sprays are commercially available and include a disinfectant with skin conditioners or emollients like glycerin, sorbitol, lanolin, propylene glycol, aloe, allantoin, and the like. Natural/organic sprays include essential oils, such as citronella, clove, and sweet basil; probiotics such as lactobacillus-based products; oil-based peppermint sprays, menthol, and other botanical extracts. Teat sealants and antimicrobial sprays may be used.

The systems illustrated schematically in the various figures comprise several non-limiting examples. Other configurations are possible, depending upon the specific design parameters. With regard to the halls, fences, gates, and other components, the embodiments illustrated schematically in FIGS. 1-14 are just some simple arrangements and obviously could take on additional forms including various shapes, widths, angles, and the like. As those skilled in this art will readily appreciate, there are countless variations possible and the embodiments herein are simple and effective—but not optimized.

The systems, rotary platforms, entry and exit platforms, chutes, fences, and position-adjustable gates may be made of stainless steels, for example, but not limited to, 304, 316, as well as titanium alloys, aluminum alloys, copper, copper alloys, and the like. Galvanized steel is quite commonly used. The skilled artisan, having knowledge of the particular application, temperatures, and available materials, will be able design the most cost effective, safe, and operable components for each particular application without undue experimentation.

The mechanical components of systems of the present disclosure need not have specific shapes or specific features as illustrated in the drawings, but rather could take any shape, such as tubular (including hollow and solid tubulars), box or cube shape, elliptical, triangular, prism-shaped, hemispherical or semi-hemispherical-shaped (dome-shaped), or combination thereof and the like, as long as the systems perform as desired. Tubular element cross-sections need not be round, but may be rectangular, triangular, round, oval, and the like. It will be understood that such embodiments are part of this disclosure and deemed with in the claims. Furthermore, one or more of the various components may be ornamented with various ornamentation produced in various ways (for example stamping or engraving, or raised features such as reflectors, reflective tape), such as facility designs, operating company designs, logos, letters, words, nicknames (for example MADERO, and the like).

From the foregoing detailed description of specific embodiments, it should be apparent that patentable systems and methods of using same have been described. Although specific embodiments of the disclosure have been described herein in some detail, this has been done solely for the purposes of describing various features and aspects and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, one modification would be to modify or retrofit an existing rotary parlor to include one or more systems of this disclosure. Certain systems and processes of this disclosure may be devoid of certain steps, components and/or features: for example, systems and rotary milking parlors devoid of exotic metals; and rotary milking parlors devoid of low-strength steels.

What is claimed is:

1. A system comprising:

a) a rotary milking platform having a plurality of milking stalls;

b) a first herringbone pen having a first plurality of animal stalls arranged in herringbone pattern;

c) a second herringbone pen having a second plurality of animal stalls arranged in herringbone pattern;

d) a rotary milking platform entry platform having a converging fencing section to force animals to move from a holding pen into consecutive ones of the first and/or second plurality of milking stalls at an angle, the entry platform having a distal edge adjacent a periphery of the rotary milking platform; and e) a rotary milking platform exit platform having a proximal edge adjacent the periphery of the rotary milking platform, and exterior exit fencing and interior exit fencing, the interior exit fencing having a V-section dividing the rotary exit platform into first and second exit platform sections, the first exit platform section further divided into a first main exterior animal exit hall and a first interior chute, the second exit platform section further divided into a second main exterior animal exit hall and a second interior chute, the second main exterior animal exit hall parallel to the first main exterior animal exit hall, and the second interior chute parallel with the first interior chute; and f) the first and second interior chutes each having a position-adjustable chute entry gate and a position-adjustable chute exit gate, each of the position-adjustable chute entry gates and position-adjustable chute exit gates being adjustable at least between a first position and a second position, the first position of the respective exit gates creating an opening allowing animals to exit respective first or second interior chutes and pass to the first herringbone pen, the second position the respective exit gates creating an opening allowing animals to exit respective first or second interior chutes and pass to the second herringbone pen or directing the animals to the first or second main animal exit halls.

2. The system of claim 1, further comprising wherein the rotary milking platform is supported by an annular stationary support.

3. The system of claim 1, further comprising wherein the first herringbone pen is configured for palpation of dairy cows.

4. The system of claim 1, further comprising wherein the second herringbone pen is configured for treatment of dairy cows.

5. The system of claim 1, further comprising wherein the second herringbone pen is in series with the first herringbone pen.

6. The system of claim 1, further comprising wherein the second herringbone pen is in parallel with the first herringbone pen.

7. The system of claim 1, further comprising wherein the interior fencing, the position-adjustable chute entry gates, and the position-adjustable chute exit gates are configured to allow animals to pass through the first and/or second interior chutes and bypass the first herringbone pen, and move into second herringbone pen.

8. The system of claim 1, wherein the first interior chute and the second interior chute are parallel, the first internal chute is a first 3-way sort chute and the second internal chute is a second 3-way sort chute, where animals enter either the first or second 3-way sort chute, and the position-adjustable chute exit gates are configured to direct the animals either to the first or the second primary exit hall, to the first herringbone pen, or to the second herringbone pen, depending on the needs of each animal.

9. The system of claim 1, wherein the first interior chute and the second interior chute are in series, the first interior chute is configured as a 2-way sort chute, the first position-adjustable chute entry gate is configured to direct all the animals to enter and pass through the 2-way sort chute, and the first position-adjustable chute exit gate is configured to direct the animals either to exit to the first or the second primary exit hall, or to the second interior chute configured as a 3-way sort chute, the second position-adjustable chute entry gate is configured to direct all the animals to enter and pass through the 3-way sort chute, and the second position-adjustable chute exit gate configured to direct the animals either to where each animal may be directed by another adjustable exit gate either to the first or the second exterior animal exit hall, to the first herringbone pen, or to the second herringbone pen, depending on the needs of each animal.

* * * * *